United States Patent [19]

Nadehara

[11] Patent Number: 5,535,412
[45] Date of Patent: Jul. 9, 1996

[54] CIRCULAR BUFFER CONTROLLER

[75] Inventor: Kouhei Nadehara, Tokyo, Japan

[73] Assignee: NEC Corporation, Tokyo, Japan

[21] Appl. No.: 520,182

[22] Filed: Aug. 28, 1995

[30] Foreign Application Priority Data

Aug. 26, 1994 [JP] Japan ................................. 6-201653

[51] Int. Cl.$^6$ ........................................ G06F 12/02
[52] U.S. Cl. .................. 395/800; 364/238.8; 364/238.6; 364/238.7; 364/DIG. 1; 395/437
[58] Field of Search .................................. 395/800, 459, 395/437

[56] References Cited

U.S. PATENT DOCUMENTS

| | | | |
|---|---|---|---|
| 4,513,392 | 4/1985 | Shenk | 395/437 |
| 5,043,870 | 8/1991 | Ditzel | 395/459 |
| 5,295,250 | 3/1994 | Komoto | 395/437 |
| 5,301,336 | 4/1994 | Kodosky | 395/800 |
| 5,388,238 | 2/1995 | McHarg | 395/437 |
| 5,463,749 | 10/1995 | Wertheizer | 395/437 |

OTHER PUBLICATIONS

J. L. Hennessy and D. A. Patterson, "Computer Architecture: A Quantitative Approach," Morgan Kaufmann Publishers, Inc., CA, 1990, pp. 160–167.

Primary Examiner—Eric Coleman
Attorney, Agent, or Firm—Sughrue, Mion, Zinn, Macpeak & Seas

[57] ABSTRACT

From a data memory, there is obtained data at an address indicated by the sum of the values respectively of a base register, an index register, and an offset. The data is stored in a data register. A wrap-around process is executed after an arithmetic operation is conducted by an arithmetic unit n times, n being specified by the value loaded in a block-length register. When the value of the index register is equal to or more than that of the element number register, the value of the element number register is subtracted from that of the index register. Since there exists a chance in which arithmetic operation is achieved beyond a circular buffer area allocated in the data memory, a copy of the first portion of the circular buffer is provided after the circular buffer area. Only one wrap-around process is executed each time a plurality of arithmetic operations are conducted, thereby implementing a high-speed circular buffer.

3 Claims, 9 Drawing Sheets

CIRCULAR BUFFER CONTROLLER

BACKGROUND OF THE INVENTION

The present invention relates to a circular buffer controller and, in particular, to a high-speed circular buffer controller capable of decreasing the number of wrap-around operations.

DESCRIPTION OF THE RELATED ART

Description will be given of a conventional method of configuring a circular buffer with reference to FIGS. 1 to 5.

As shown as A in FIG. 1, when a circular buffer is mapped onto an area 33 allocated to a circular buffer in an address space of a one-dimensional uniform data memory, there are conventionally utilized a device shown in FIG. 2 and a procedure described below.

Figure 1:
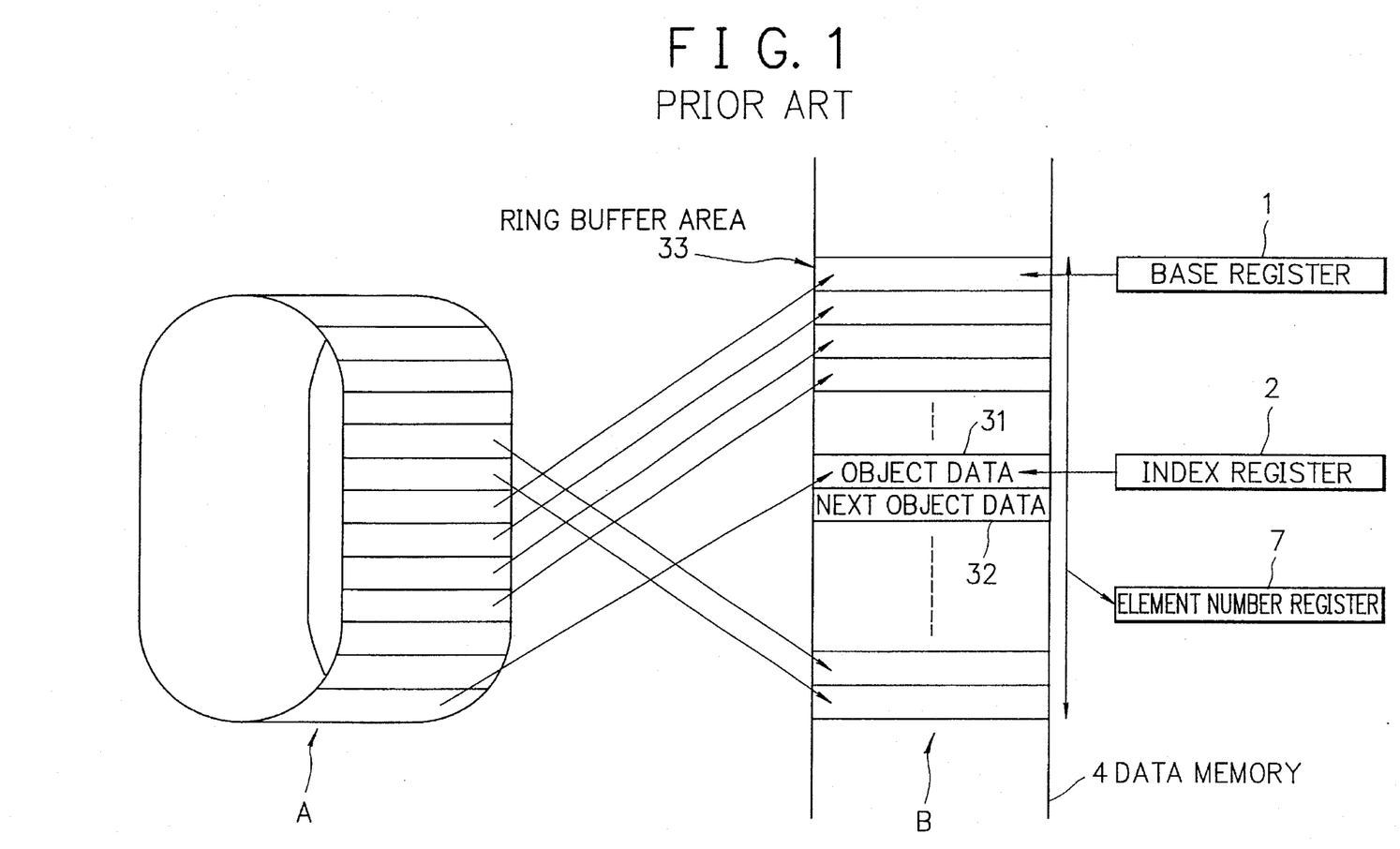
FIG. 1 is a schematic diagram showing a relationship between logical concept of a circular buffer and a physical configuration thereof.
Figure 2:
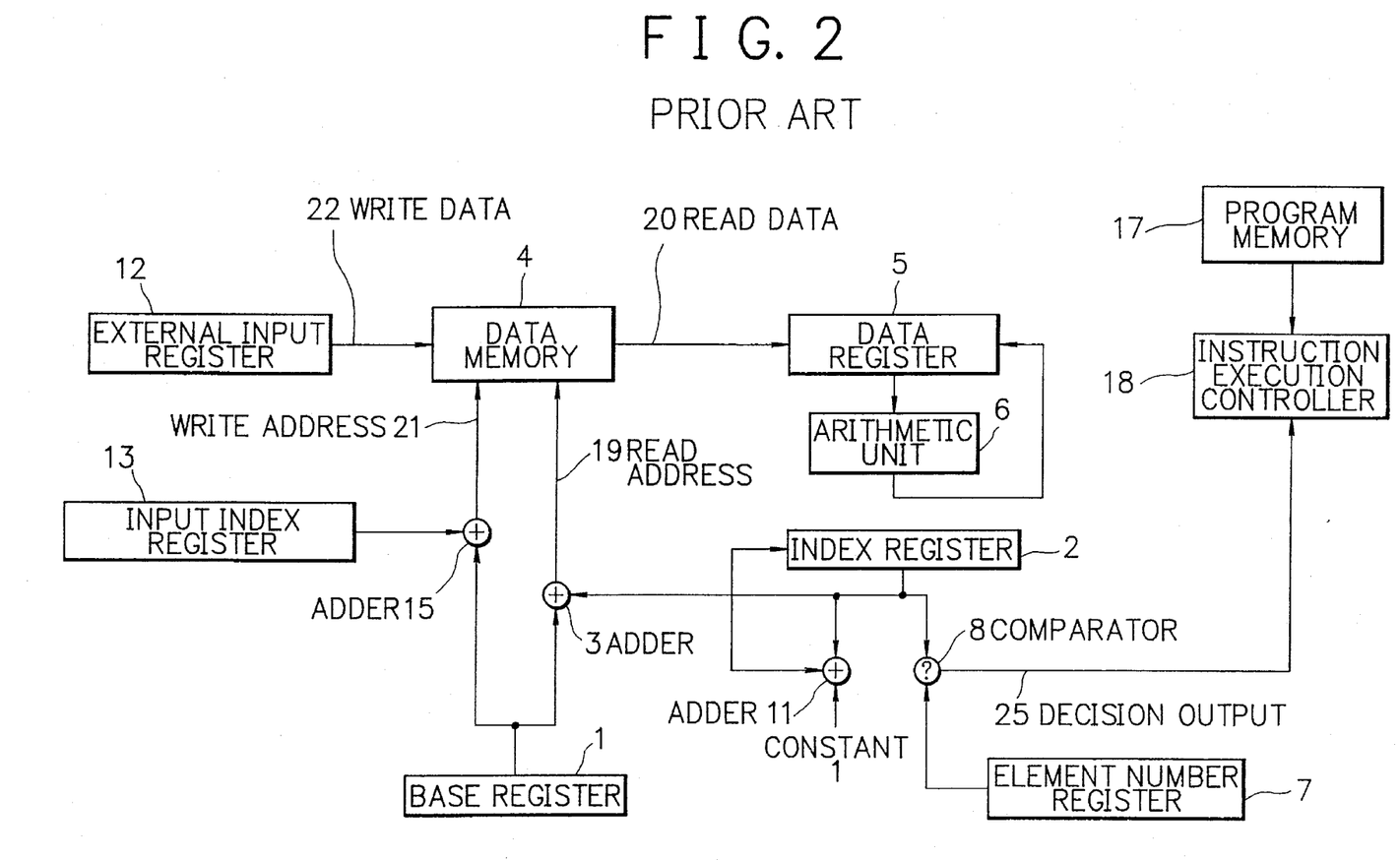
FIG. 2 is a block diagram showing the circuit configuration of a circular buffer controller of the prior art.
Figure 3:
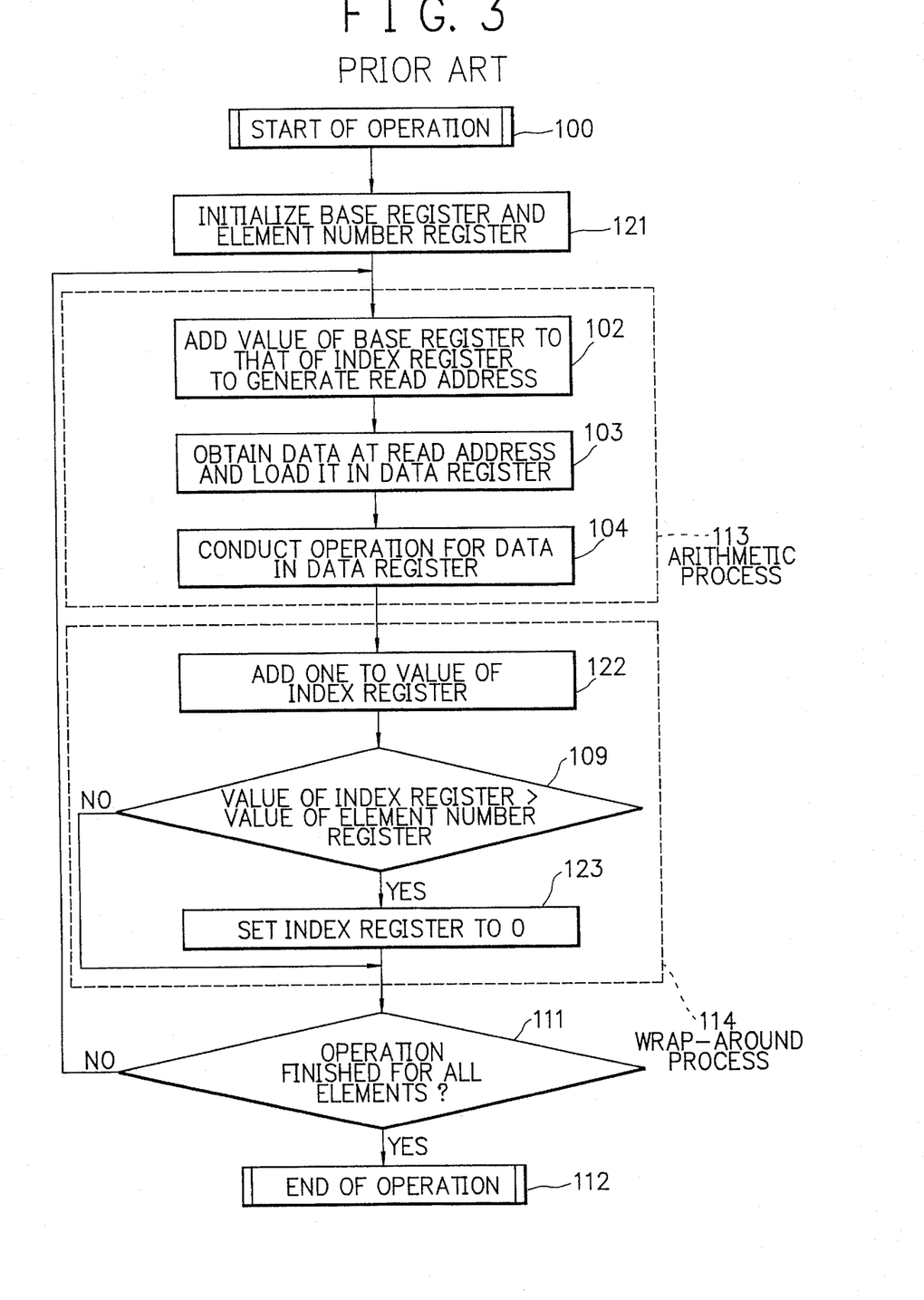
FIG. 3 is a flowchart showing an operation procedure of an arithmetic operation carried out for data in a circular buffer in accordance with a conventional method.

In FIGS. 1 and 2, the circular buffer has a start address loaded in a base register 1, and the number of elements to be stored in the circular buffer is set to an element number register 7 (step 121 of FIG. 3). An address of data 31 to be processed in the circular buffer is stored in an index register 2.

To decide a read address 19 of the data 31 in the data memory 4, the value of the index register 2 is added to that of the base register 1 by an adder 3 (step 102). The real address thus obtained is fed to the data memory 4 such that the data 31 is read therefrom and is loaded in a data register 5 (step 103) to be thereafter processed by an arithmetic unit 6 (step 104).

When an arithmetic process 113 is completely achieved for the data 31, the value of the index register 2 is updated to indicate next data 32. Namely, an instruction execution controller 18 increments the value of the index register 2 by an adder 11 (step 122) and then checks by a comparator 8 whether or not the resultant value of the index register 2 exceeds the value of the element number register 7 (step 109). Referencing a decision signal 25, the controller 18 clears the value of the index register 2 to 0 if the resultant value is greater (step 123). The operation above is called a wraparound operation 114.

Figure 4:
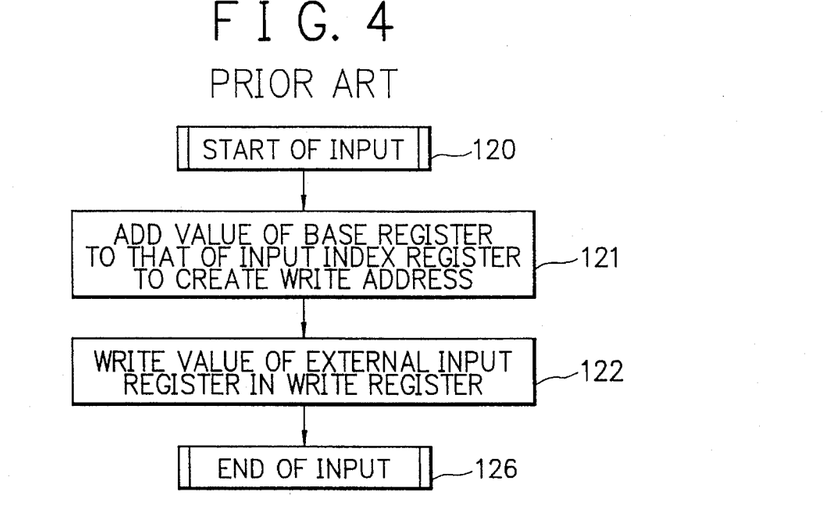
FIG. 4 is a flowchart showing an operation flow to update data in a circular buffer according to a conventional method.

FIG. 4 shows a procedure of supplying new input data from an external input register 12 to the circular buffer. Assume that the input index register 13 keeps therein a position of the circular buffer in which the new input data is to be input. The value of a base register 1 is added to that of an input index register 13 to attain a real address in the data memory 4 (step 121). The value of the external input register 12 is then written in the memory 4 at the obtained real address (step 122).

Figure 5:
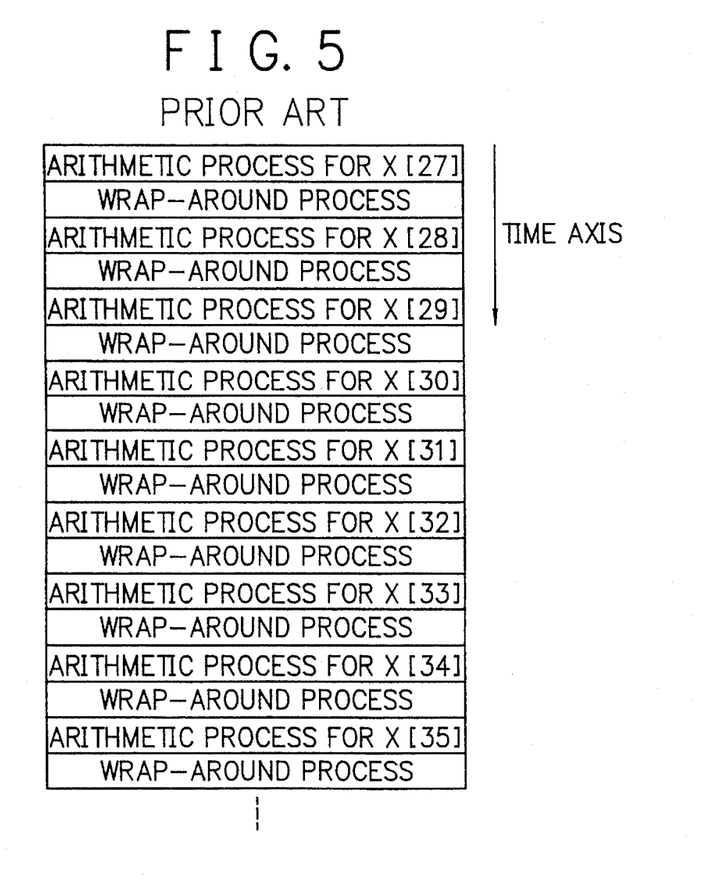
FIG. 5 is a timing chart showing an example of operation of the circular buffer in accordance with a conventional method.

FIG. 5 shows an execution sequence of instructions when the circular buffer is operated under a conventional buffer controller. As can be seen from FIG. 5, according to the buffer controller of the prior art, one wrap-around process is necessary for each data operation. This makes it impossible to achieve processing at a high speed.

SUMMARY OF THE INVENTION

It is therefore an object of the present invention to provide a high-speed circular buffer controller in which the number of wrap-around operations is decreased for each data operation, thereby removing the problem of the prior art.

In accordance with the present invention, there is provided a circular buffer controller comprising a base register for keeping therein a first address of a circular buffer, an index register for indicating data as a current object of operation, a first adder for adding a value of the base register, a value of the index register, and a value of offset from an instruction execution controller and thereby deciding a read address of data as an object of operation, a data memory for storing therein data as an object of an operation, a data register for storing therein data read from the data memory according to the read address, an arithmetic unit for conducting an arithmetic operation for the data stored in the data register, an element number register for keeping therein a number of elements in the circular buffer, a block-length register for keeping therein a number of elements to be processed at a time, a second adder operative after the arithmetic operation is executed n times (n being associated with the value of the block-length register) for adding the value of the block-length register to that of the index register, a first comparator operative after the value of the block-length register is added to that of the index register for comparing the value of the element number register with that of the index register, a first subtracter for subtracting the value of the element number register from that of the index register when the value of the index register is equal to or more than that of the element number register, an external input register for keeping therein a new value to be inputted to the circular buffer, an index register for keeping therein a position in the circular buffer in which the value of the external input register is inputted, a third adder for adding the value of the input index register to that of the base register and determining an address in the data memory at which the value of the external input register is to be written, a second comparator for deciding that the value of the input index register is less than that of the block-length register, a fourth adder operative when the second comparator produces an output of "truth" for adding the value of the element number register to the write address, thereby producing an address, a program memory for storing therein software controlling an overall operation of the circular buffer controller, and an instruction execution controller for referencing contents of the program memory and signals output respectively from the first and second comparators and for controlling the overall operation.

First, an arithmetic operation is conducted for a number of successive elements beginning at an address attained by adding the value of the base register to that of the index register, the number being specified by the block-length number of register. Thereafter, a wrap-around process is carried out. Namely, when a value obtained by adding the value of the block-length register to that of the index register is equal to or more than that of the element number register, the value of the element number register is subtracted from that of the index register.

Thanks to the operation above, only one wrap-around process is required for the number of operations specified by the block-length register. Consequently, the number of wrap-around processes is remarkably minimized and hence the processing speed of the circular buffer is considerably increased.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

Referring now to the accompanying drawings, description will be given of an embodiment of the circular buffer controller in accordance with the present invention.

Figure 6:
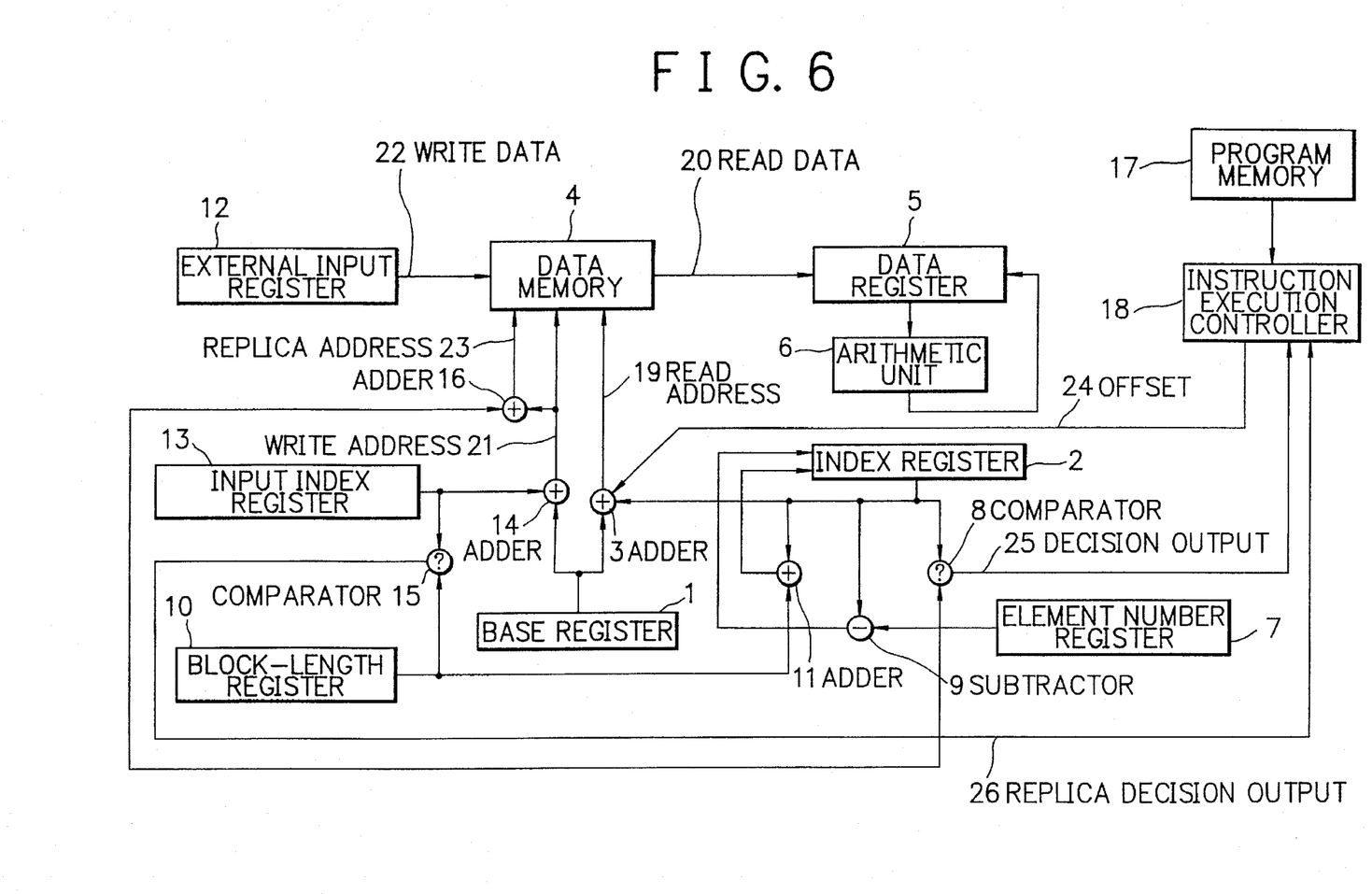
FIG. 6 is a block diagram showing an embodiment of a circular buffer controller in accordance with the present invention.

FIG. 6 shows in a block diagram an embodiment of the circular buffer controller of the present invention. As can be seen from the configuration diagram of FIG. 6, the embodiment includes a base register 1 for storing therein a start address of a circular buffer, an index register 2 for indicating an object of the current operation, a first adder 3 for adding to each other the values respectively of the base register 1 and index register 21 and the value of offset supplied from an instruction execution controller 18 and thereby deciding a read address 19 of the data, a data memory 4 for storing therein data as an object of operation, a data register 5 for storing therein data 20 read from the data memory 4, an arithmetic unit 6 for conducting an arithmetic operation for the data stored in the data register 5, an element number register 7 for keeping therein the number of elements in the circular buffer, a first comparator 8 for comparing the value of the element number register 7 with that of the index register 2, a subtracter for subtracting the value of the element number register 7 from that of the index register 2, a block-length register 10 for keeping therein a length of data to be processed at a time, a second adder 11 for adding the value of the block-length register 10 to that of the index register 2, an external input register 12 for keeping therein a new value to be fed to the circular buffer, an input index register 13 for keeping therein a position in the circular buffer in which the value of the external input register 12 is to be input, a third adder for adding the values respectively of the input index register 13 and base register 1 and thereby determining an address 21 in the data memory 4 in which the value of the external input register 12 is to be written, a second comparator 15 for deciding that the value of the input index register 13 is less than that of the block-length register 10, a fourth adder 16 for adding, when the output from the comparator 15 is "truth", the value of the write address 21 to that of the element number register 7 and thereby producing a replica address 23, a program memory 17 for storing therein software to control the overall operation of the system, and an instruction execution controller 18 for controlling the overall operation by referencing the contents of the program memory 17 and signal outputted from the first and second comparators 8 and 15, respectively.

Figure 7:
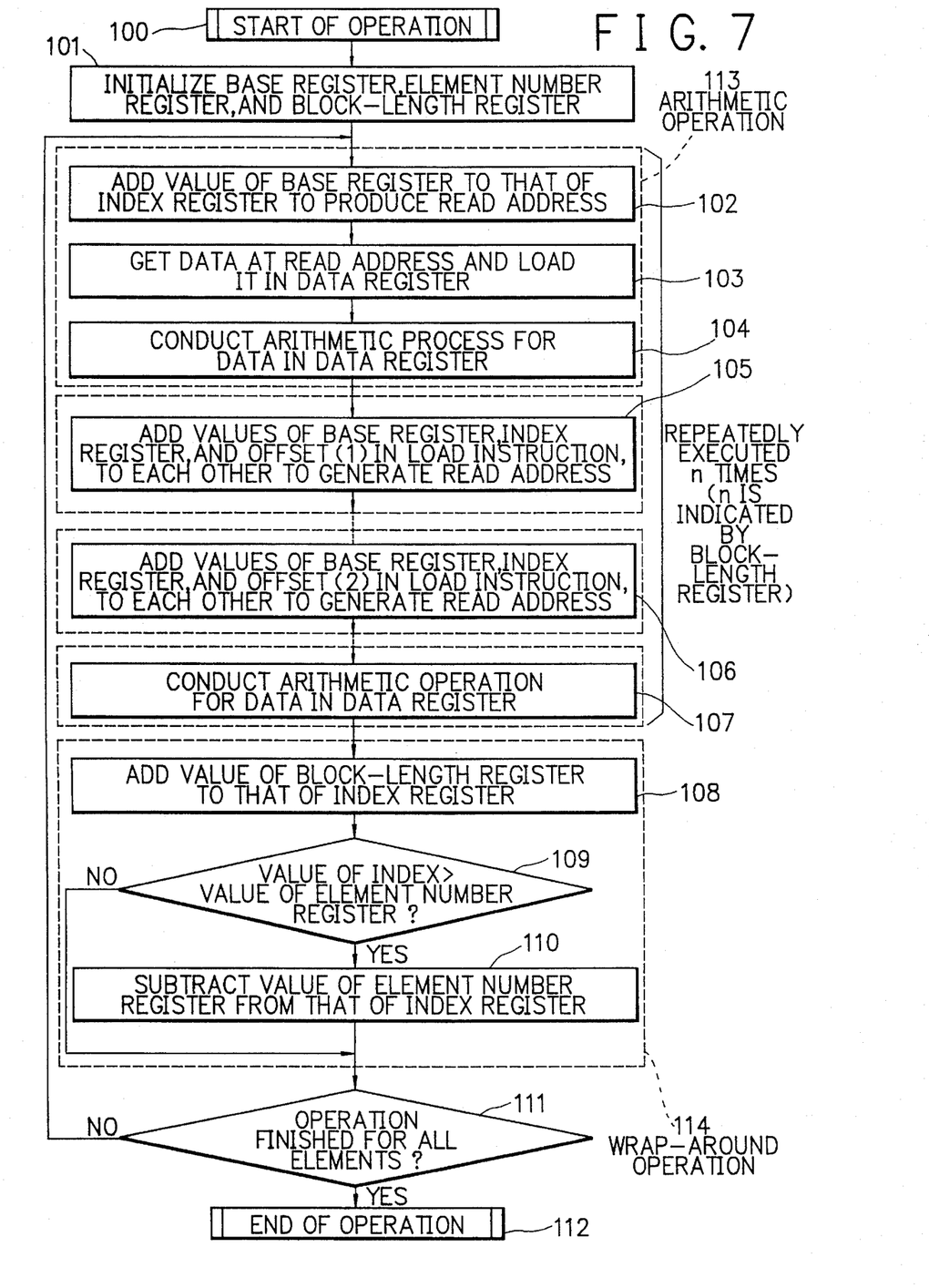
FIG. 7 a flowchart showing a procedure of an arithmetic operation carried out for data in a circular buffer in accordance with the present invention.

Operation of the embodiment will be next described by referring to FIGS. 6 and 7.

First, the system is initialized. Namely, the start address of the circular buffer area 33 assigned in the data memory 4 is set to the base register 1, the capacity (N elements) of the circular buffer is loaded in the element number register 7, and the number (n) of elements to be processed at a time is written in the block-length register (step 101).

Assume that a relative address of data 31 as an object of operation relative to the first position of the circular buffer is set to the index register 2. Namely, the objective elements are accessed beginning at a position indicated by the index register 2 for desired operations.

First, the value of the base register 1 is added to that of the index register 2 to convert the distance of the data 31 relative to the first address of the circular buffer indicated by the value of the index register 2 into a read address 19 in the data memory 4 (step 102). The data 31 is read therefrom according to the read address 19 to be moved to the data register 5 (step 103). An arithmetic operation is carried out for the data in the data register 5 (step 104).

The next step is a wrap-around process 114 in the conventional technology. However, in accordance with the present invention, another element is obtained as the next objective data from the circular buffer to continuously accomplish operations (steps 105 to 107). Namely, the value of the base register 1 is added to that of the index register 2. Values of 1, 2, . . . , (n−1) are respectively added to the resultant value by the adder 3 to obtain the subsequent objective elements in a sequential fashion. Each data element is sequentially stored in the data register 5 and then the arithmetic operation is conducted for the data therein. Ordinarily, microprocessors handle instructions which access data at an address obtained by adding a constant (displacement) of about 16 (bits) to the value of the associated register (J. L. Hennessy and D. A. Patterson, "Computer Architecture: A Quantitative Approach," pp. 160–167, Morgan Kaufmann Publishers, Inc., CA, 1990). Consequently, when the result of addition between the base register 1 and index register 2 is loaded in another general register, the access address of the data can be obtained adding the constant to the value of the general register without causing any overhead in the process.

For the data in the circular buffer, the arithmetic operation 113 is repeatedly executed n times, n being specified by the value of the block-length register 10. Thereafter, the wrap-around operation 114 is achieved. That is, the value of the block-length register 10 is added to that of the index register 2 (step 108) and then the resultant value of the index register 2 is compared with that of the element number register 7 (step 109). If the value of the index register 2 is equal to or more than the value N of the element number register 7, the value N is subtracted from the value of the index register 2 (step 110).

After the wrap-around process 114 is finished, a check is conducted to decide whether or not the operation has been completely terminated for all elements. If there exists any element to be processed, the operation is executed again (step 111).

Owing to the method above, only one wrap-around operation is to be carried out each time the desired operation is executed n times. When compared with the conventional method, the number of required wrap-around processes is reduced to 1/n of the original value and hence the processing speed is remarkably increased.

However, in the method of the embodiment, distinct from the prior art in which the wrap-around process is executed each time the desired operation is finished, only one wrap-around process is conducted each time the operation is executed n times. Consequently, depending on the position of the element specified as the object of operation by the value of the index register 2, it may possibly occur that the operation is executed at a position exceeding the final available point (beyond the last element (n−1)) in circular buffer area allocated in the data memory 4.

Figure 8:
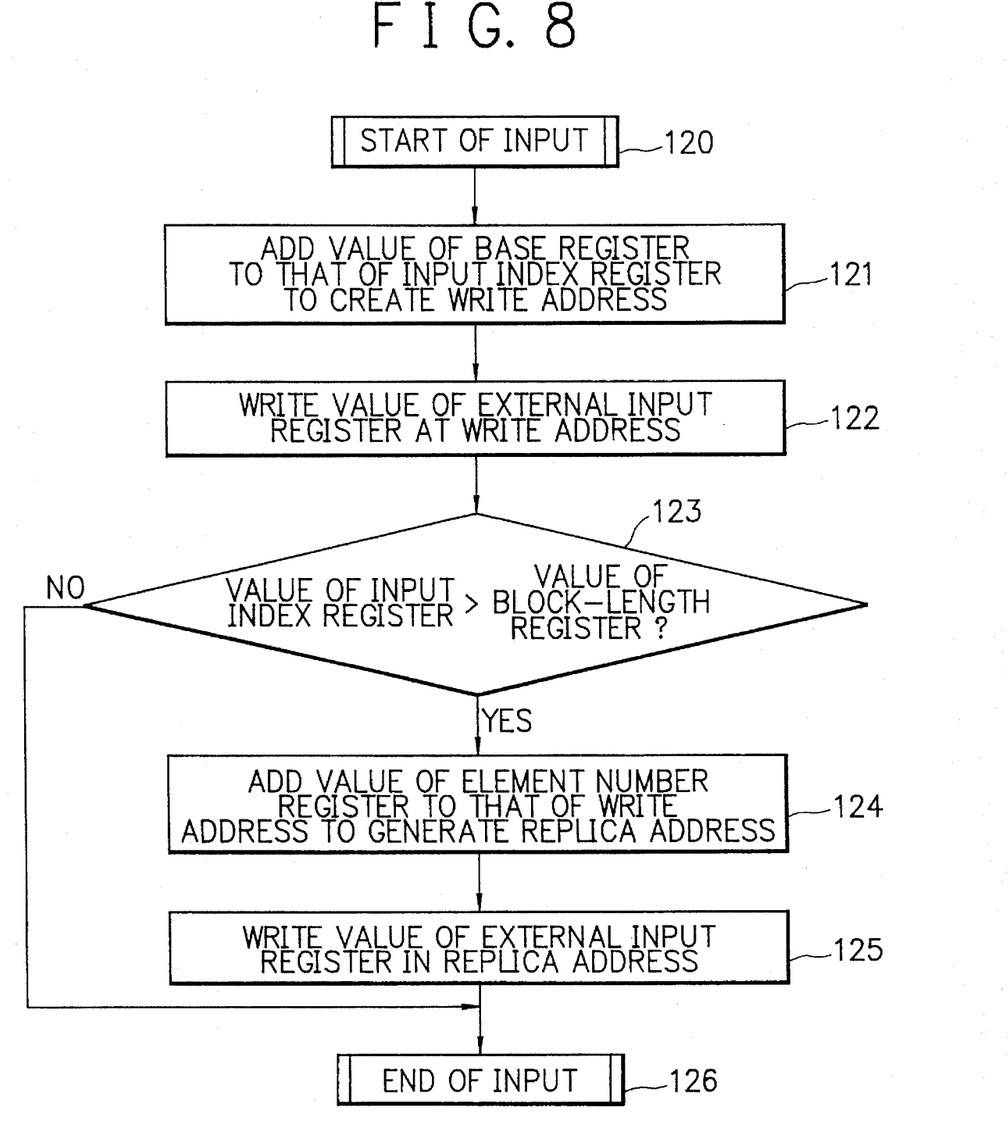
FIG. 8 is a flowchart showing an operation flow to update data in a circular buffer of the present invention.

In consequence, when the new value kept in the external input register 12 is input to the circular buffer at a position designated by the input index register 13, the operation is required to be executed according to a procedure shown in FIG. 8. Namely, the value of the base register 1 is added to that of the input index register 13 by the adder 14 to attain a write address in the data memory 4 (step 121). The new data is fed from the external input register 12 to the data memory 4 at the write address 21 and then a comparison is achieved between the block-length register 10 and input index register 13 by the comparator 15 (step 123). If the value of the input index register 13 is less than that of the block-length register 10, the value of the element number register 7 is added to the write address to produce a replica write address 23 (step 124) so as to write the value of the external input register 12 also in the memory 4 at the replica write address 23. As a result, copied items of n−1 leading elements of the circular buffer are stored in the memory 4 immediately after the circular buffer. Consequently, even when the operation is carried out at a position exceeding the circular buffer area due to reduction of the number of wrap-around processes, there can be obtained an appropriate result.

Figure 9:
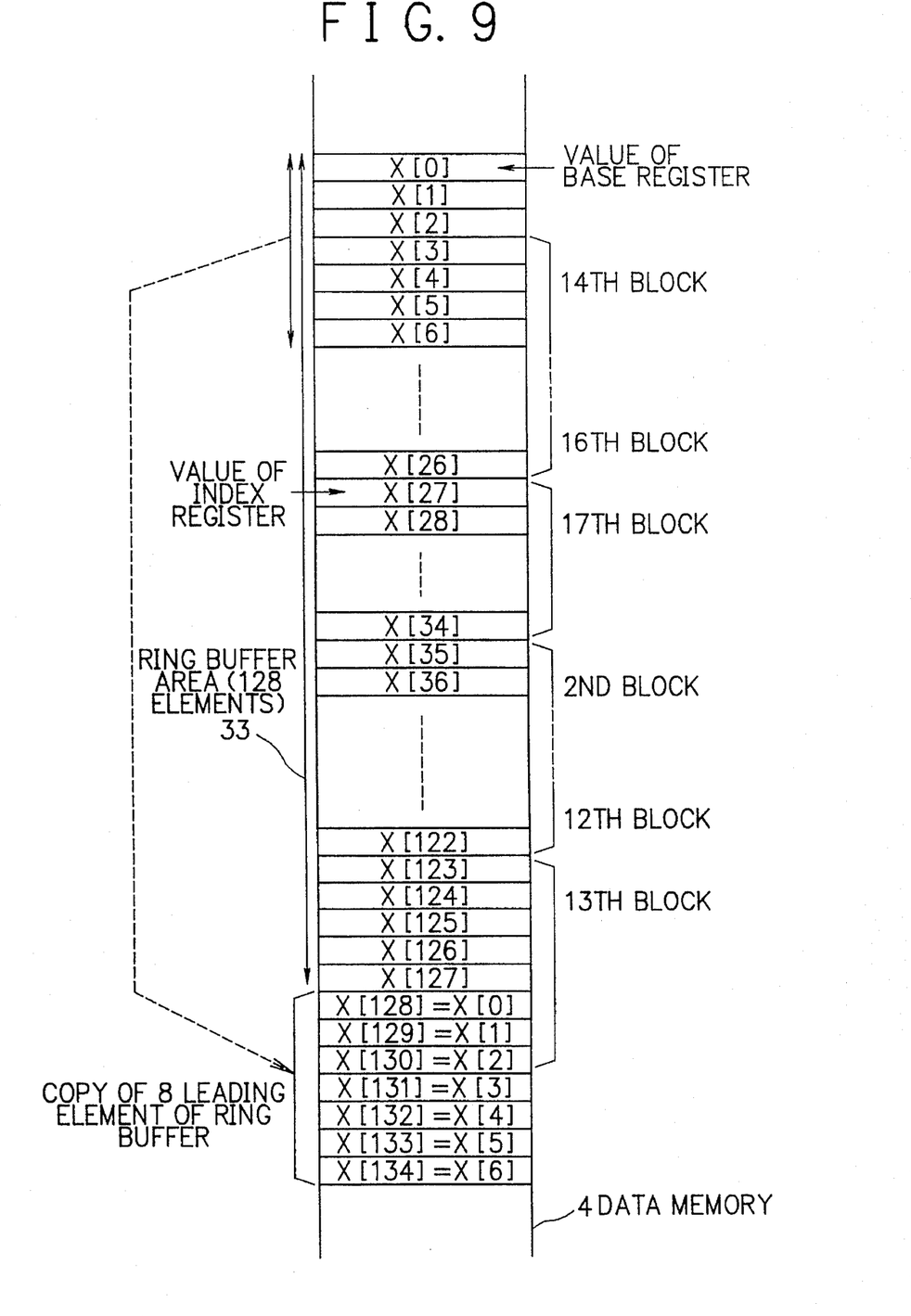
FIG. 9 is a memory map for specifically explaining an operation example of a circular buffer.

Referring now to FIG. 9, description will now be given of a specific example of operation of a circular buffer including 128 elements when the block length n is eight. Assume that a circular buffer area 33 is beforehand prepared in the data memory 4, the area 33 including an array X[0 to 127] of 128 elements followed by X[128 to 135] which is a copy of X[0 to 6]. On this occasion, when the operation is desired to be commenced, for example, at the 28th element, it is assumed that a value "27" is set to the index register 2.

First, the first block including eight elements X[27 to 34] is processed. Namely, these elements are sequentially read from the data memory 4 to be loaded in the data register for the operation thereof. When all elements are processed, the first wrap-around operation 114 is carried out. In this operation 114, the value of the index register 2 is 35 obtained by adding the value "8" of the block-length register 10 to the current value "27" of the index register 2. The resultant value "35" is less than the value "128" of the element number register 7 and hence is used for the subsequent process.

Next, the second block including X[35 to 42] is processed and then the second wrap-around operation 114 is conducted such that the index register 2 is resultantly set to a value "43".

The operation above is similarly accomplished for the subsequent blocks up to the 12th block. When the 12th wrap-around process 114 is finished, the index register 2 is set to a value "123". This value is still less than the value "128" of the element number register and is therefore employed in the subsequent process of the 13th block.

When processing the 13th block, eight elements beginning at X[123] are successively read from the memory for the operation thereof. However, when five elements are processed, control reaches the final element X[127] of the circular buffer. Consequently, in place of the sixth, seventh, and eighth elements of the 13th block, the copy of the leading elements X[0 to 2] of the circular buffer prepared immediately after the circular buffer is used. Namely, when the operation 113 is finished for these copied elements, the 13th wrap-around process 114 is executed. In this process 114, the value "123" of the index register 2 is added to the value "8" of the block-length register to attain a result "131". Since this value exceeds 128 in the element number register 7, the value "128" is subtracted from the value of the index register 2. As a result, the value of the index register 2 becomes 3. The 14th block is processed with this value. Elements of X[3 to 11], X[12 to 19], and X[20 to 27] are sequentially processed for the 14th, 15th, and 16th blocks, respectively. When the processing of the 16-th block is finished, the operation of the 128 elements is assumed to be completed.

Figure 10:
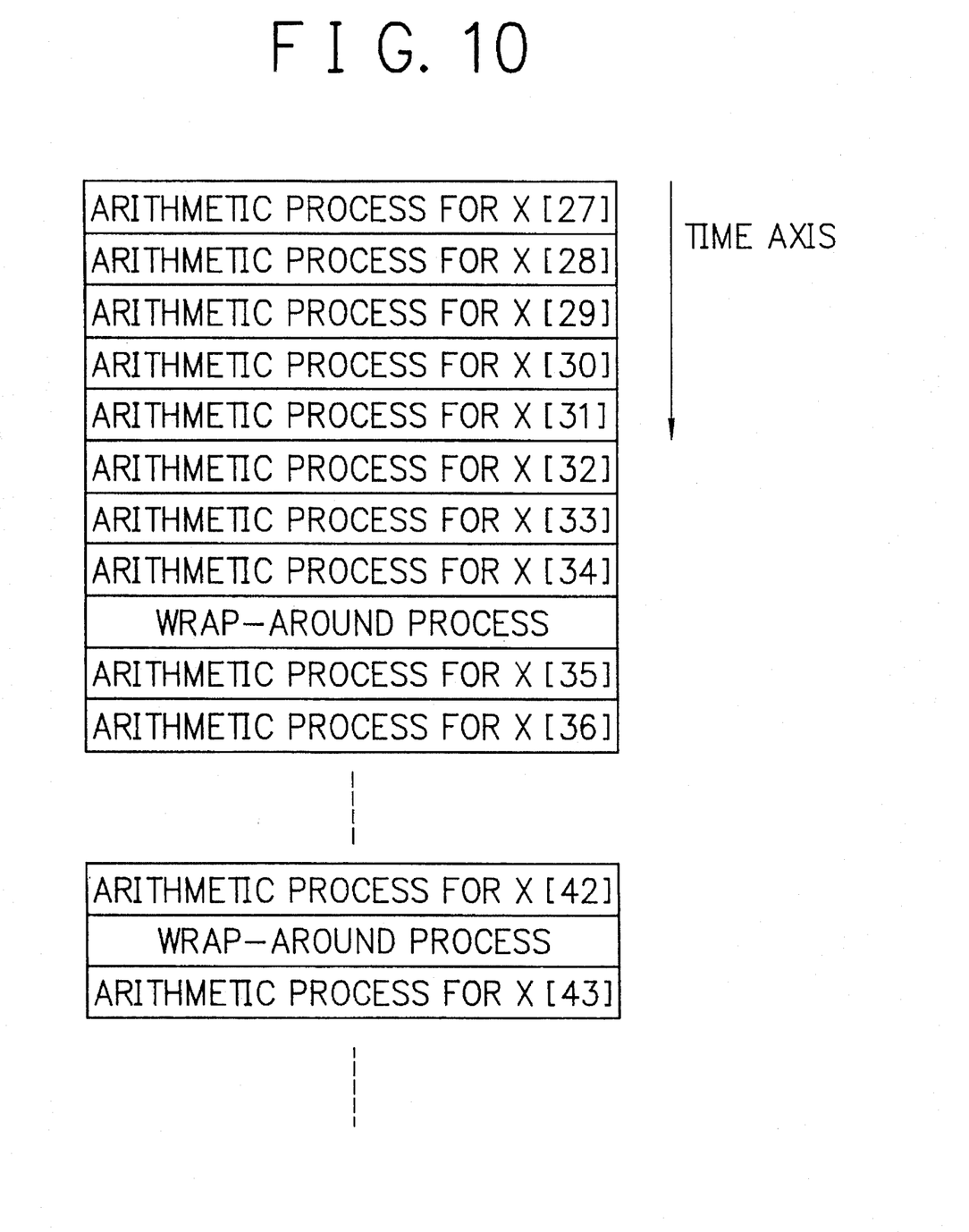
FIG. 10 is a timing chart showing an operation example in accordance with the present invention.

FIG. 10 shows the arithmetic process 113 and wrap-around process 114 sequentially executed with respect to time by the circular buffer controller in accordance with the present invention. In the prior art, one wrap-around process is necessary for each arithmetic process as shown in FIG. 5. In accordance with the present invention, as can be seen from FIG. 10, only one wrap-around process is required each time the arithmetic process is executed eight times. This consequently leads to a remarkable increase in the processing speed of the circular buffer.

Additionally, there is attained a secondary advantageous effect as follows. In the conventional method, as shown in FIGS. 3 and 5, when the wrap-around process 113 and arithmetic process 114 are alternately executed, the operation of loading the data 31 in the data register 5 (step 103) and the arithmetic operation for the data in the data register 5 (step 104) are required to be consecutively executed. Namely, in an apparatus in which a considerable Latency of time takes place from when a load instruction is executed for transfer of data 31 to the data register 5 to when the data 31 is actually loaded in the data register 5, there arises a problem of a long interlock period. In contrast therewith, as shown in FIGS. 7 and 10, since a plurality of arithmetic processes 113 are sequentially conducted in accordance with the present invention, when the operation of loading a plurality of data items in the data register 5 (step 103) and the arithmetic operation thereof (step 104) are interleaved, the wait time can be avoided and hence the processing speed is further increased.

Incidentally, in the description of the above embodiment, the value of the index register 2 is incremented by the adder 11 beginning at a value "0" to detect an event that the resultant value becomes equal to or more than the value N of the element number register 7 by the comparator 8 so as to thereafter execute the wrap-around process 114. However, it may also possible to first set the value of the element number register 7 to the index register 2 such that the value of the index register 2 is decremented by a subtracter provided in place of the adder 11. When the resultant value is equal to or less than 0, the wrap-around process 114 is executed.

Furthermore, the read data is once stored in the data register 5 for the arithmetic operation thereof in the embodiment. However, the present invention is applicable also to an apparatus in which the read data 20 is directly supplied to the arithmetic unit 6.

As described above, in the circular buffer controller in accordance with the present invention, one wrap-around process is effected each time a plurality of arithmetic operations are executed. This consequently leads to an advantage that the overhead of the wrap-around process is reduced and hence a high-speed arithmetic operation can be carried out for each element of the circular buffer.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A circular buffer controller, comprising:

a base register for keeping therein a first address of a circular buffer;

an index register for indicating data as a current object of operation;

a first adder for adding a value of the base register, a value of the index register, and a value of offset from an instruction execution controller and thereby deciding a read address of data as an object of operation;

a data memory for storing therein data as an object of an operation;

a data register for storing therein data read from the data memory according to the read address;

an arithmetic unit for conducting an arithmetic operation for the data stored in the data register;

an element number register for keeping therein a number of elements in the circular buffer;

a block-length register for keeping therein a number of elements to be processed at a time;

a second adder operative after the arithmetic operation is executed n times (n being associated with the value of the block-length register) for adding the value of the block-length register to that of the index register;

a first comparator operative after the value of the block-length register is added to that of the index register for comparing the value of the element number register with that of the index register;

a first subtracter for subtracting the value of the element number register from that of the index register when the value of the index register is equal to or more than that of the element number register;

an external input register for keeping therein a new value to be inputted to the circular buffer;

an index register for keeping therein a position in the circular buffer in which the value of the external input register is inputted;

a third adder for adding the value of the input index register to that of the base register and determining an address in the data memory at which the value of the external input register is to be written;

a second comparator for deciding that the value of the input index register is less than that of the block-length register;

a fourth adder operative when the second comparator produces an output of "truth" for adding the value of the element number register to the write address, thereby producing an address;

a program memory for storing therein software controlling an overall operation of the circular buffer controller; and an instruction execution controller for referencing contents of the program memory and signals outputted respectively from the first and second comparators and for controlling the overall operation.

2. A circular buffer controller as claimed in claim 1, further including a second subtracter in place of the second adder, wherein the value of the element number register is first set to the index register such that the value of the index register is decremented by the second subtracter, thereby detecting by the first comparator an event that the value of the index register is equal to or less than 0.

3. A circular buffer controller as claimed in claim 1, wherein the arithmetic unit reads data from the data memory and then directly executes an arithmetic operation for the data stored in the data memory.

* * * * *